(12) United States Patent
Okura

(10) Patent No.: US 12,489,136 B2
(45) Date of Patent: Dec. 2, 2025

(54) LITHIUM ION SECONDARY BATTERY AND METHOD FOR PRODUCING THE LITHIUM ION SECONDARY BATTERY

(71) Applicant: Prime Planet Energy & Solutions, Inc., Tokyo (JP)

(72) Inventor: Toshinori Okura, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 619 days.

(21) Appl. No.: 17/589,904

(22) Filed: Feb. 1, 2022

(65) Prior Publication Data
US 2022/0302494 A1 Sep. 22, 2022

(30) Foreign Application Priority Data
Mar. 17, 2021 (JP) ................. 2021-043765

(51) Int. Cl.
| | |
|---|---|
| H01M 10/0525 | (2010.01) |
| H01M 10/44 | (2006.01) |
| H01M 10/48 | (2006.01) |
| H02J 7/00 | (2006.01) |

(52) U.S. Cl.
CPC ..... *H01M 10/0525* (2013.01); *H01M 10/446* (2013.01); *H01M 10/486* (2013.01); *H02J 7/0048* (2020.01)

(58) Field of Classification Search
CPC ........... H01M 10/0525; H01M 10/446; H01M 10/486; H01M 10/049; H01M 10/058; H01M 2010/4292; H02J 7/0048; Y02E 60/10; Y02P 70/50
See application file for complete search history.

(56) References Cited

U.S. PATENT DOCUMENTS

| | | | |
|---|---|---|---|
| 2012/0141869 A1 | 6/2012 | Takahata | |
| 2016/0372798 A1 | 12/2016 | Ishii | |
| 2019/0273248 A1* | 9/2019 | Yamada | ................ H01M 4/131 |
| 2022/0294024 A1* | 9/2022 | Choi | ................ H01M 10/0587 |

FOREIGN PATENT DOCUMENTS

| | | | |
|---|---|---|---|
| CN | 105359308 A | 2/2016 | |
| JP | 2014203551 A | 10/2014 | |
| JP | 201511930 A | 1/2015 | |
| JP | 2016139548 A | 8/2016 | |
| JP | 2017107795 A | 6/2017 | |
| JP | 2020167054 A | 10/2020 | |
| KR | 20130000598 A * | 1/2013 | ............. H01G 11/14 |
| WO | 2011024250 A1 | 3/2011 | |

OTHER PUBLICATIONS

Chaouachi et al. Electrochimica Acta 366 137428 (Year: 2020).*
KR20130000598A translation (Year: 2013).*

* cited by examiner

*Primary Examiner* — Allison Bourke
*Assistant Examiner* — Travis L. Martin
(74) *Attorney, Agent, or Firm* — HAUPTMAN HAM, LLP

(57) ABSTRACT

A lithium ion secondary battery includes a positive electrode and a negative electrode in which a positive-to-negative electrode capacity ratio between a positive capacity of the positive electrode and a negative capacity of the negative electrode is in a range of 1.02 to 1.40, and a negative electrode irreversible capacity of the negative electrode is larger than a positive electrode irreversible capacity of the positive electrode.

1 Claim, 5 Drawing Sheets

LITHIUM ION SECONDARY BATTERY AND METHOD FOR PRODUCING THE LITHIUM ION SECONDARY BATTERY

CROSS-REFERENCE TO RELATED APPLICATIONS

This application is based upon and claims the benefit of priority to Japanese Patent Application No. 2021-043765 filed on Mar. 17, 2021, the entire contents of which are incorporated herein by reference.

BACKGROUND

Technical Field

The present disclosure related to a lithium ion secondary battery and a method for producing the lithium ion secondary battery.

Related Art

As lithium-ion batteries (hereinafter, also referred to simply as "batteries") used for hybrid vehicles (HVs), high-power batteries tend to be demanded. Further, as batteries used for electric vehicles (EVs), plug-in hybrid vehicles (PHVs), and others, high-capacity and compact batteries may be required to be used over a wide SOC range (e.g., from 10% SOC or less to 95% SOC or more).

In producing batteries, meanwhile, uncharged batteries are first manufactured and then these batteries are charged initially, i.e., for the first time, and further subjected to high-temperature aging and other operations, to complete the batteries. When those batteries are charged for the first time as above, solid electrolyte interphase (SEI) generated by decomposition of electrolyte components contained in an electrolyte solution is deposited on a positive electrode and a negative electrode of each battery, so that irreversible capacity occurs therein. The irreversible capacity generated in each of the positive electrode and the negative electrode due to the initial charging is generally proportional to the magnitude of the positive and negative electrode capacities. A conventional art related to initial charging and others is disclosed for example in WO 2011/024250A (refer to the claims and others of this document).

SUMMARY

Technical Problems

In order to produce the above-mentioned batteries for EVs and other applications as higher capacity and more compact batteries, it is conceivable to reduce the amount of negative electrode reserve and set the magnitude of the negative electrode capacity (CN) relative to the positive electrode capacity (CP) to be smaller than that in the high-power batteries for hybrid vehicles (HVs), for example, set a positive-to-negative electrode capacity ratio (RC=CN/CP) to about 1.2, e.g., in a range of 1.02 to 1.40. If the positive electrode capacity (CP) is not reduced but the negative electrode capacity (CN) is reduced, that is, the positive-to-negative electrode capacity ratio (RC) is adjusted close to 1, the irreversible capacity of the positive electrode will not change, whereas the irreversible capacity of the negative electrode will decrease.

This may cause the negative electrode irreversible capacity to be smaller than the positive electrode irreversible capacity. In such a case, if a battery is discharged in a low SOC range (e.g., SOC of 20% or less, but SOC of 0% or more) and a battery voltage is lowered, a positive electrode potential will largely drop before a negative electrode potential rises. This leads to a problem with an increase in battery resistance (DC-IR). This is conceived to be because when the positive active material is filled with a large amount of Li ions due to discharge, the Li ions are hard to move within the positive active material, causing the positive electrode potential to decrease and the battery resistance to increase.

The present disclosure has been made to address the above problems and has a purpose to provide a high-capacity and compact battery with a small positive-to-negative electrode capacity ratio, but with a suppressed increase in battery resistance even in a low SOC range, and a method for producing the lithium-ion secondary battery.

(1) To achieve the above-mentioned purpose, one aspect of the present disclosure provides a lithium ion secondary battery including: a positive electrode; and a negative electrode, wherein a positive-to-negative electrode capacity ratio between a positive capacity of the positive electrode and a negative capacity of the negative electrode is in a range of 1.02 to 1.40, and a negative electrode irreversible capacity of the negative electrode is larger than a positive electrode irreversible capacity of the positive electrode.

The battery is configured such that the positive-to-negative capacity ratio is in the range of 1.02 to 1.40, and the negative electrode irreversible capacity is larger than the positive electrode irreversible capacity as described above. In other words, even though the foregoing battery is a high-capacity and compact battery with a small positive-to-negative electrode capacity ratio, the negative electrode irreversible capacity is larger than the positive electrode irreversible capacity unlike the above-mentioned matters described as the problems to be solved. Therefore, when the battery is discharged in the low SOC region to reduce the battery voltage, the negative electrode potential significantly increases, causing the battery voltage to decrease, before the positive electrode potential lowers. This configuration can prevent the use of the region where the positive electrode potential significantly drops, and suppress an increase in battery resistance in the low SOC region.

The positive-to-negative electrode capacity ratio (RC) is the ratio of the positive electrode capacity (CP) to the negative electrode capacity (CN), that is, RC=CN/CP. The lower limit of the positive-to-negative electrode capacity ratio is set to 1.02 in consideration of the following conditions: (i) a negative active material layer has to include an area that faces a positive active material layer to prevent Li metal precipitation on the negative electrode and thus the negative active material layer must be wider than the positive active material layer; (ii) the negative electrode capacity per unit area must be larger than the positive electrode capacity per unit area; and (iii) the assembly accuracy (positioning accuracy, etc.) for an electrode body. On the other hand, for initial charging and others, when any process for increasing the negative electrode irreversible capacity, for example, a first initial-charging step and a first high-temperature aging step which will be mentioned later, is not performed, the upper limit of the positive-to-negative electrode capacity ratio, i.e., 1.40, is an upper limit in the range of the positive-to-negative electrode capacity ratio at which the negative electrode irreversible capacity is smaller than the positive electrode irreversible capacity.

(2) To achieve the above purpose, another aspect of the present disclosure provides a method for producing a lithium ion secondary battery, the lithium ion secondary battery including: a positive electrode; and a negative electrode, wherein a positive-to-negative electrode capacity ratio between a positive capacity of the positive electrode and a negative capacity of the negative electrode is in a range of 1.02 to 1.40, and a negative electrode irreversible capacity of the negative electrode is larger than a positive electrode irreversible capacity of the positive electrode, wherein the method comprises: first initial-charging of initially charging an uncharged battery having the positive-to-negative electrode capacity ratio in the range of 1.02 to 1.40, under a first in-charging battery temperature within a first battery temperature range of 20° C. to 25° C. to a first SOC within a first SOC range of 2% to 13%; first high-temperature aging of placing the lithium ion secondary battery having been charged to the first SOC into a condition under a first aging ambient temperature within a first ambient temperature range of 60° C. to 65° C. for a first aging period within a first period range of 5 to 25 hours while a positive terminal and a negative terminal are open; second initial-charging of initially charging the lithium ion secondary battery, after the first high-temperature aging, under a second in-charging battery temperature within a second battery temperature range of 20° C. to 25° C. to a second SOC within a second SOC of 13% to 91%, the second SOC being higher than the first SOC; and second high-temperature aging of placing the lithium ion secondary battery having been charged to the second SOC into a condition under a second aging ambient temperature within a second ambient temperature range of 60° C. to 75° C. for a second aging period within a second period range of 6 to 30 hours while the positive terminal and the negative terminal are open.

In this production method, the battery, after being charged to the low, first SOC in the first initial-charging, is placed under the high, first aging ambient temperature in the first high-temperature aging. In the second initial-charging, subsequently, the battery is charged to the second SOC higher than the first SOC and then placed again under a high temperature, which is the second aging ambient temperature, in the second aging. In this way, the battery is charged at the low, first SOC and subjected to the high temperature aging, and thereafter the battery is charged to the relatively high, second SOC and subjected to the high temperature aging. As compared with a conventional art in which the first initial-charging and the first high-temperature aging are not adopted and a battery is charged for the first time to a relatively high SOC from the beginning and then subjected to the high-temperature aging, the foregoing configuration of the present disclosure can increase the negative electrode irreversible capacity generated in the negative electrode sheet and thus achieve a battery having a larger negative electrode irreversible capacity than a positive electrode irreversible capacity, even though it has a positive-to-negative electrode capacity ratio in a range of 1.02 to 1.40.

Accordingly, this disclosure can produce a lithium ion secondary battery, which is a high capacity and compact battery with a small positive-to-negative electrode capacity ratio, but with a suppressed increase in battery resistance even in a low SOC region.

Furthermore, between the first high-temperature aging and the second initial-charging, it is preferable to sufficiently fit the temperature of the battery to a temperature for the second initial-charging prior to the second initial-charging to perform the second initial-charging under a situation where the battery voltage is stable and uniform.

DETAILED DESCRIPTION OF THE EXEMPLARY EMBODIMENTS

Figure 1:
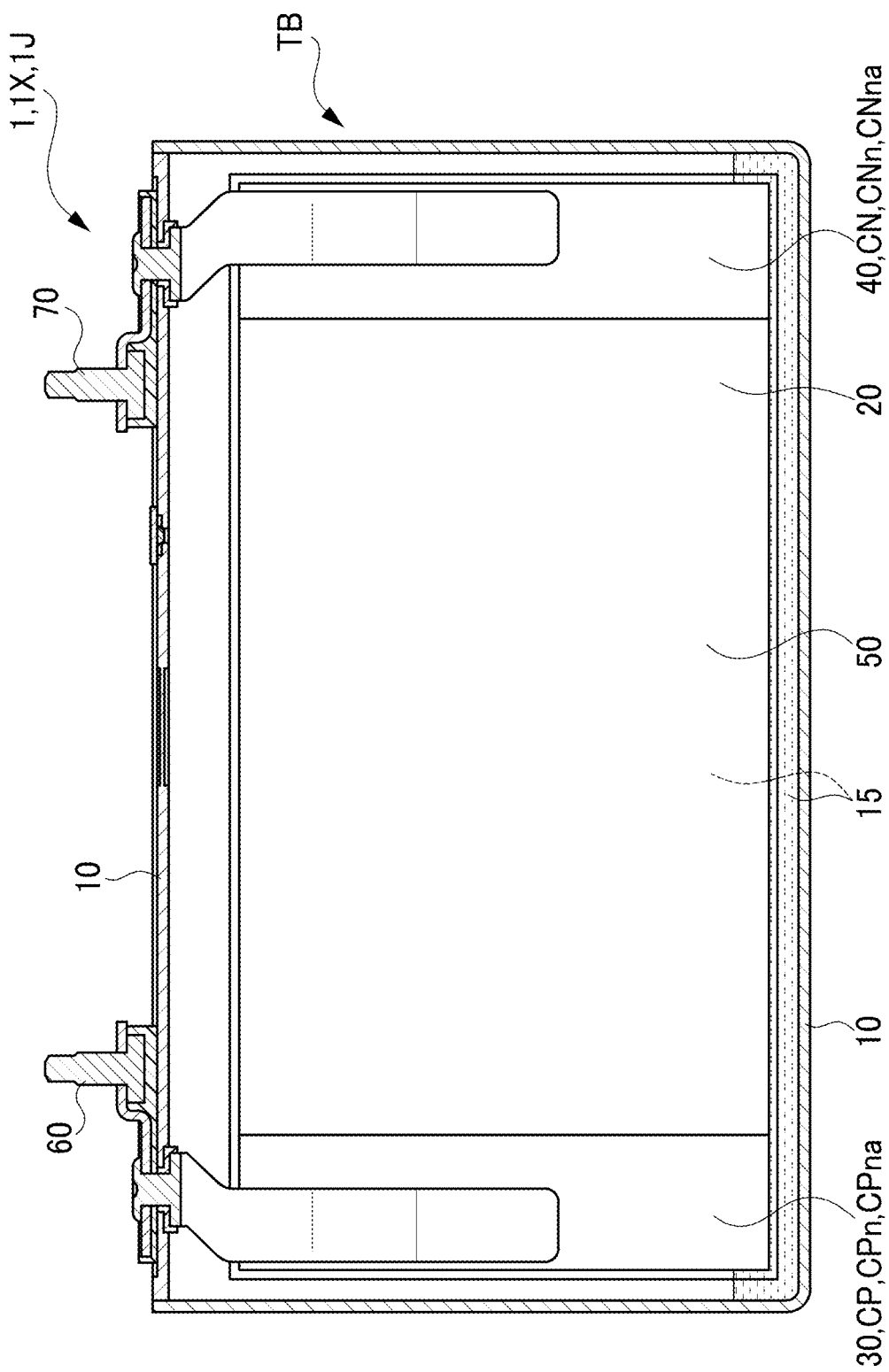
FIG. 1 is a longitudinal cross-sectional view of a battery in an embodiment.

A detailed description of an embodiment of the present disclosure and a reference embodiment will now be given referring to the accompanying drawings. FIG. 1 is a longitudinal cross-sectional view of a lithium ion secondary battery 1 in the present embodiment (hereinafter, also referred simply to as a battery) and a battery 1J in the reference embodiment. This battery 1 in the present embodiment includes a battery case 10 having a rectangular parallelepiped box-like shape, a flat wound electrode body 20 and an electrolyte solution 15, which are contained in the battery case 10, a positive electrode terminal member 60 and a negative electrode terminal member 70, which are supported by the battery case 10, and others. The battery 1J in the reference embodiment is identical in structure to the above-mentioned battery 1 of the present embodiment.

The electrode body 20 consists of a strip-shaped positive electrode sheet 30 and a strip-shaped negative electrode sheet 40, and a pair of strip-shaped separators 50 so that the electrode sheets 30 and 40 are wound by alternately interposing each separator 50 between them. In the present embodiment, the positive active material contained in a positive active material layer of the positive electrode sheet 30 is lithium transition metal composite oxide, specifically, lithium nickel-cobalt-manganese oxide. The negative active material contained in a negative active material layer of the negative electrode sheet 40 is carbon material, specifically, graphite. Herein, it is assumed that the positive electrode capacity of the positive electrode sheet 30 is CP (Ah) and the negative electrode capacity of the negative electrode sheet 40 is CN (Ah) (see FIGS. 3 and 5).

As mentioned above, the negative active material layer (not shown) of the negative electrode sheet 40 and the positive active material layer (not shown) of the positive electrode sheet 30 are arranged facing each other through the separator. However, the negative active material layer has to be wider than the positive active material layer, and furthermore has to be arranged to include the area where the negative active material layer faces the positive active material layer, i.e., the negative active material layer faces any part of the positive active material layer. Further, the negative electrode capacity per unit area in the negative active material layer has to be set larger than the positive electrode capacity per unit area in the positive active material layer. This is to prevent precipitation of Li metal on the negative electrode sheet 40 during charging of the battery 1, 1J. In addition, also considering assembly requirements, such as positioning accuracy, of the positive electrode sheet 30 and the negative electrode sheet 40 through the separators 50 as the electrode body 20, the negative electrode capacity CN of the negative electrode sheet 40 has to be slightly larger than the positive electrode capacity CP of the positive electrode sheet 30. It is thus considered that the positive-to-negative electrode capacity ratio RC (=CN/PC) has to be set to at least 1.02 or more.

On the other hand, if the negative electrode capacity CN of the negative electrode sheet 40 is sufficiently larger than the positive electrode capacity CP of the positive electrode sheet 30, such as in a high-power battery, a negative electrode irreversible capacity CNn can be increased more than a positive electrode irreversible capacity CPn without the need to perform the first initial-charging step S3 and the first high-temperature aging step S4 described later. Considering this point, when the process for increasing the negative electrode irreversible capacity CNn, such as the first initial-charging step S3 and the first high-temperature aging step S4, is not performed, the upper limit of the positive-to-negative electrode capacity ratio RC in the present embodiment is given as an upper limit value in the range of the positive-to-negative electrode capacity ratio RC in which the negative electrode irreversible capacity CNn is smaller than the positive electrode irreversible capacity CPn. This upper limit of the positive-to-negative electrode capacity ratio RC is approximately 1.40.

For the battery 1 in the present embodiment and the battery 1J in the reference embodiment, the positive-to-negative electrode capacity ratio RC, which is CN/CP, is set to 1.38.

The electrolyte solution 15 used herein is a non-aqueous electrolyte solution containing lithium salt as a support salt in an organic solvent. The support salt used in the electrolyte solution 15 may include for example lithium salts, such as $LiPF_6$, $LiBF_4$, $LiClO_4$, $LiAsF_6$, $Li(CF_3SO_2)_2N$, and $LiCF_3SO_3$. These support salts may be used alone or in combination of two or more. Particularly, a preferable example is $LiPF_6$, which is also used in the present embodiment. The electrolyte solution 15 may be prepared, for example, so that the concentration of the support salt(s) falls within a range of 0.7 to 1.3 mol/L.

The non-aqueous solvent used in the electrolyte solution 15 can be appropriately selected from any organic solvents usable for general lithium-ion secondary batteries. Particularly, preferable non-aqueous solvents may include carbonates, such as ethylene carbonate (EC), dimethyl carbonate (DMC), ethyl methyl carbonate (EMC), diethyl carbonate (DEC), propylene carbonate (PC). These organic solvents can be used alone or in combination of two or more. One example for use may include a mixture of EC, DMC, and EMC mixed at a volume ratio of about 2 to 5:2 to 5:2 to 5.

Furthermore, a selected one or a combination of selected two or more from carboxylic acid anhydrides, such as maleic anhydride and succinic anhydride, and dicarboxylic acids, such as oxalic acid and malonic acid, can be added at approximately 0.1 to 1 weight %. In addition, a selected one or a combination of selected two or more from vinylene carbonate (VC), vinyl ethylene carbonate (VEC), ethylene sulfite, and fluoroethylene carbonate can be added at approximately 0.1 to 1 weight %.

Reference Embodiment

Herein, prior to describing each step of producing a battery 1 in the present embodiment by a production method in the present embodiment using an uncharged battery 1X having a small positive-to-negative electrode capacity ratio RC (RC=1.38), a reference embodiment will be described to show steps of producing the battery 1J from the uncharged battery 1X by a conventional method without performing a first initial-charging step S3 and a first high-temperature aging step S4 of the present embodiment mentioned later, and the properties of the produced battery 1J, with reference to FIGS. 2 and 5.

In an assembly step S1, the uncharged battery 1X is first assembled by a known method (see FIG. 1). In a stacking load application step S2, a plurality of the assembled batteries (ten assembled batteries in the reference embodiment) 1X, which will become the batteries 1J, are stacked and restrained with a restraining jig (not shown) under a predetermined load BL1 (9 kN in the reference embodiment). While the plurality of batteries 1J (the batteries 1X) being subjected to the first load BL1 to as above, each of steps SJ3 to SJ5 indicated by broken lines and an inspection step S9 are performed for each battery 1J.

Figure 2:
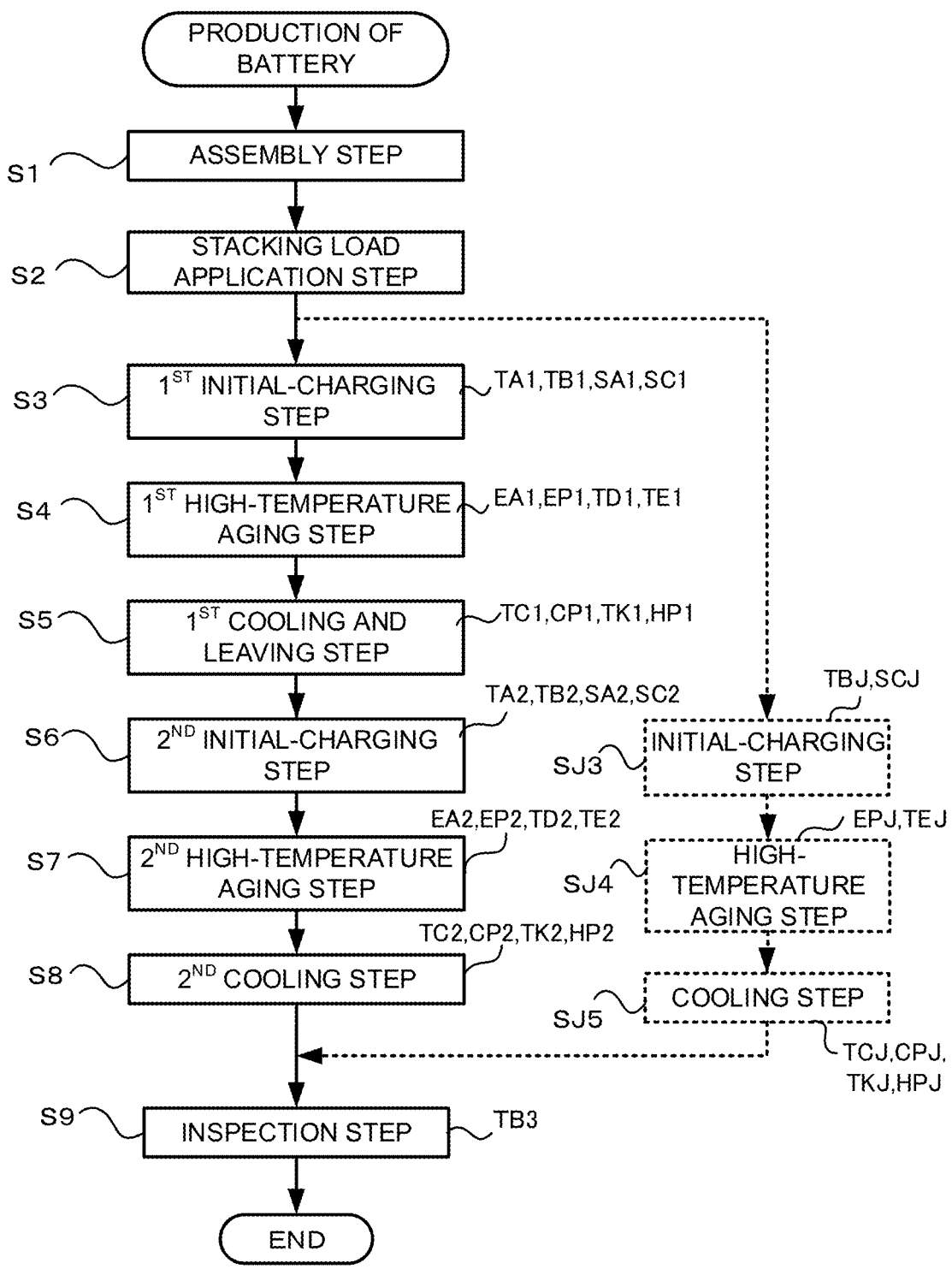
FIG. 2 is a flowchart of a process for producing the battery including two initial-charging steps and two high-temperature aging steps in the embodiment, in which a broken line indicates a conventional process for producing a battery including a single initial-charging step and a single high-temperature aging step.

In the reference embodiment, after the stacking load application step S2, the process advances to an initial-charging step SJ3 as indicated by the broken line in FIG. 2, where a battery temperature TB of the battery 1X is set to a battery temperature TBJ during charging, which will be referred to as an in-charging battery temperature TBJ (20.0° C. in the reference embodiment), and the battery is charged until an initial-charging SOC reaches a predetermined value SCJ (91% in the reference embodiment). Specifically, a charge-discharge device (not shown) is connected to both terminal members 60, 70 of each battery 1X restrained with the restraining jig, and each battery 1J (battery 1X) is initially charged by constant current constant voltage (CCCV) charging until the battery voltage VB of each battery 1X reaches a predetermined value (3.97 V, corresponding to SCJ=91%, in this reference embodiment).

In a high-temperature aging step SJ4 indicated by the broken line in FIG. 2, subsequently, the battery 1J having been initially charged to the initial-charging SOC (SCJ=91%) in the initial-charging step SJ3 is subjected to high-temperature aging in which the battery is placed under an aging ambient temperature TEJ (63° C. in this reference embodiment) for an aging period EPJ (20 hours in this reference embodiment) while the positive terminal member 60 and the negative terminal member 70 are open. If the high-temperature aging is performed under such a high SOC, it is considered that the generation of SEI advances on the negative electrode sheet 40 of each battery 1J and thus a negative electrode irreversible capacity CNna occurs. Further, in the positive electrode sheet 30, it is considered that a positive electrode irreversible capacity CPna occurs due to a decrease in positive electrode capacity caused by the reaction of fluorine containing support salt, such as $LiPF_6$, which makes up the electrolyte solution 15, with moisture, generating hydrofluoric acid and destroying the crystal structure of the positive active material (see FIG. 5).

In a cooling and leaving step SJ5 indicated by the broken line in FIG. 2, subsequently, the batteries 1J are forcibly cooled by a fan for a cooling period CPJ (for 20 minutes in this reference embodiment) in a cooling room (not shown) under a cooling ambient temperature TCJ (20° C. in the present embodiment). Furthermore, the batteries 1J are transferred to a standby room (not shown) controlled at an ambient temperature TKJ (20.0° C. in this reference embodiment), and left standing for a leaving period HPJ (30 minutes in this reference embodiment) to regulate the battery temperature TB of the batteries 1J to a third battery temperature TB3 (20.0° C. in this reference embodiment) equal to the ambient temperature TKJ (see FIG. 2).

Thereafter, in an inspection step S9, as in the embodiment described below, the battery 1 having been adjusted to the third battery temperature TB3, 20.0° C., is subjected to various tests (their details are omitted), such as a self-discharge test to check the magnitude of self-discharge and a capacity test to check the magnitude of the capacity of the battery 1 to select out a good battery or batteries 1J.

Thus, a battery or batteries 1J with a positive-to-negative electrode capacity ratio RC (RC=CN/CP=1.38) are obtained by the conventional method.

The positive electrode irreversible capacity CPna and the negative electrode irreversible capacity CNna generated in each battery 1J are generally respectively proportional to the positive electrode capacity CP of the positive electrode sheet 30 and the negative electrode capacity CN of the negative electrode sheet 40 of each battery 1J (battery 1X). Specifically, when the above-mentioned initial-charging step SJ3 and high-temperature aging step SJ4 are performed for the battery(s) 1J (the battery(s) 1X), the positive electrode irreversible capacity CPna is about 3% of the positive electrode capacity CP, and the negative electrode irreversible capacity CNna is about 2% of the negative electrode capacity CN.

Therefore, if a battery 1J (battery 1X) has a sufficiently large negative electrode capacity CN of the negative electrode sheet 40 as compared to a positive electrode capacity CP of the positive electrode sheet 30, specifically, if the positive-to-negative electrode capacity ratio RC is larger than 1.5 (RC=CN/CP>1.5), unlike the above example, the negative electrode irreversible capacity will be larger than the positive electrode irreversible capacity.

If such a battery with a large negative electrode irreversible capacity compared to a positive electrode irreversible capacity is increasingly discharged and gradually approaches a low SOC state, such as a SOC of 10% or less, the negative electrode potential NE significantly increases before the positive electrode potential PE greatly decreases. Thus, the battery voltage VB, which is given by the difference between the positive electrode potential PE and the negative electrode potential NE, decreases, for example, approaches a predetermined voltage VB1 of 3.0V, which corresponds to 0% SOC Therefore, the battery is not used in the range where the positive electrode potential PE greatly decreases, in which the SOC is 0% or less, and the battery resistance Rb does not rise too much even in the low SOC region.

In the battery(s) 1J (the battery(s) 1X), as described above, the negative electrode capacity CN of the negative electrode sheet 40 is not too large as compared to the positive electrode capacity CP of the positive electrode sheet 30; a positive-to-negative electrode capacity ratio RC, which is CN/CP, is equal to or less than 1.40 (RC=CN/CP≤1.40). Specifically, the positive-to-negative electrode capacity ratio RC is 1.38 (RC=CN/CP=1.38). Therefore, the positive electrode irreversible capacity CPna and the negative electrode irreversible capacity CNna generated through the above-mentioned initial-charging step SJ2 and high-temperature aging step SJ3 are as shown in the upper graph of FIG. 5, where the negative electrode irreversible capacity CNna is smaller than the positive electrode irreversible capacity CPna (CPna>CNna).

If the battery(s) 1J in the reference embodiment, in which the negative electrode irreversible capacity CNna is smaller than the positive electrode irreversible capacity CPna as described above, is increasingly discharged to a low SOC state, for example, to a SOC of 10% or less, contrary to the above example, the positive electrode potential PE greatly decreases before the negative electrode potential NE greatly rises along a double-dotted line (i.e., in a right region with a large SOC in FIG. 5), and thus the battery voltage VB decreases, approaching a predetermined value VB1$a$ of 3.0V, corresponding to 0% SOC. Therefore, in this battery 1J, the range of the low SOC region, in which the positive electrode potential PE greatly decreases, is used, so that the battery 1J tends to increase the battery resistance RB in the low SOC region as shown in the lower graph in FIG. 5.

Figure 5:
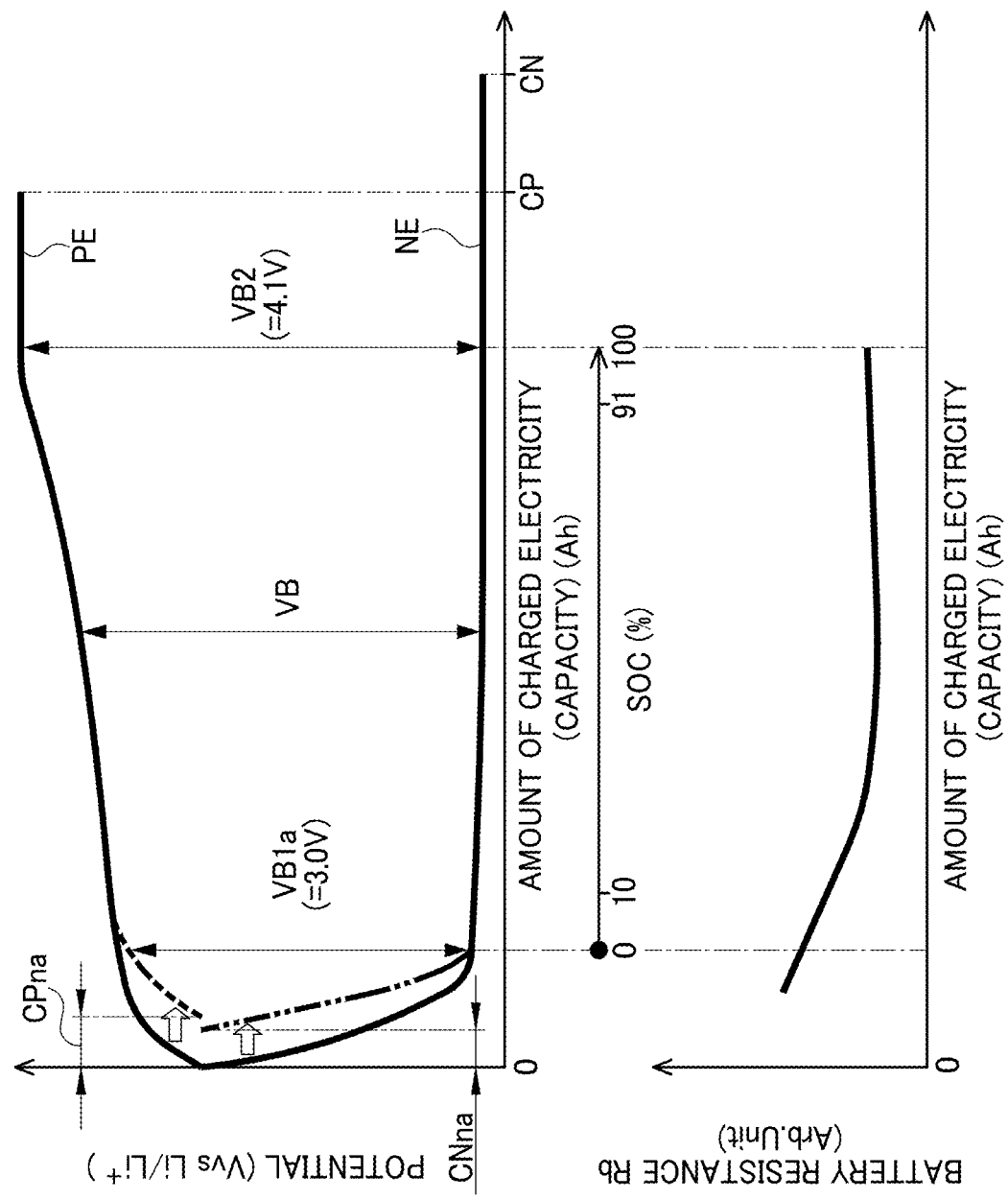
FIG. 5 is a graph showing battery properties in a reference embodiment in which conventional initial charging and high-temperature aging are performed with a small positive-to-negative electrode capacity ratio, in which an upper graph shows a relationship between a charged charge amount (capacity) and a potential, and a lower graph shows a relationship between a charged charge amount (capacity) and a battery resistance.

In the range where the positive electrode potential PE indicated by the broken line in the upper graph in FIG. 5 greatly decreases, that is, in the state where the positive active material is filled with a large amount of Li ions due to discharge, it is conceived that the Li ions are unlikely to move within the positive active material, causing a decrease in the positive electrode potential, and the battery resistance Rb increases.

Embodiment

Next, a method for producing a battery 1 in the present embodiment will be describe below (see FIG. 2). As in the reference embodiment, in the assembly step S1, an uncharged battery 1X (see FIG. 1) is first assembled by a known method. In the stacking load application step S2, a plurality of the assembled batteries (ten assembled batteries in the present embodiment) 1X, which will be batteries 1, are stacked and restrained by the restraining jig under a predetermined first load BL1, which is also 9 kN in the present embodiment. While the batteries 1 (the batteries 1X) are being subjected to the first load BL1 as above, the first initial-charging step S3 to the inspection step S9 mentioned later indicated by solid lines are performed for each battery 1.

In the first initial-charging step S3, the battery temperature TB of each battery 1X is adjusted to a first in-charging battery temperature TB1 (20° C. in the present embodiment) in a first battery temperature range TA1 of 20° C. to 25° C., and then each battery 1X is charged until a first SOC reaches a predetermined value SC1 in a first SOC range SA1 of 2% to 13% (SC1=10% in the present embodiment). Specifically, a charge-discharge device (not shown) is connected to both terminal members 60 and 70 of each battery 1X restrained by the restraining jig, and the battery 1 (battery 1X) is subjected to first initial-charging by constant current constant voltage (CCCV) charging until the battery voltage VB of the battery 1X reaches a predetermined value (3.44 V, corresponding to SC1=10% in the present embodiment).

In the first high-temperature aging step S4, subsequently, first high-temperature aging is performed in which each battery 1 initially charged to the first SOC (SC1=10%) in the first initial-charging step S3 is placed under a first aging ambient temperature TE1 (63° C. in the present embodiment) within a first ambient temperature range TD1 of 60° C. to 65° C. for a first aging period EP1 (20 hours in the present embodiment) within a first period range EA1 of 5 to 25 hours while the positive terminal member 60 and the negative terminal member 70 are open. It is considered that the high-temperature aging performed under such a low SOC may selectively cause the generation of SEI in the battery 1, especially, on the negative electrode sheet 40, so that the negative electrode irreversible capacity CNn increases.

Next, in a first cooling and leaving process S5, the batteries 1 are forcibly cooled by a fan for a first cooling period CP1 (20 minutes in this embodiment) in a cooling room (not shown) under a first ambient temperature TC1 (20.0° C. in this embodiment). Furthermore, the batteries 1 are transferred to a standby room (not shown) controlled at the first ambient temperature TK1 (20.0° C. in this embodiment), and left standing for a first leaving period HP1 (30 minutes in this embodiment) to adjust the battery temperature TB of the batteries 1 to a second in-charging battery temperature TB2 (20.0° C. in this embodiment) that is equal to the first ambient temperature TK1 (see FIG. 2). When the batteries 1 are thus sufficiently fit to the temperature for a second initial-charging step S6 described below prior to the second initial-charging step S6, the second initial-charging step S6 can be performed under a situation where the battery voltage is stable and uniform.

In the second initial-charging step S6, each battery is charged until a second SOC reaches a predetermined value SC2 in a second SOC range SA2 of 13% to 91% (SC2=91% in the present embodiment), at a second in-charging battery temperature TB2 (20.0° C. in the present embodiment) within a second battery temperature range TA2 of 20° C. to 25° C. Specifically, as in the first initial-charging step S3, the charge-discharge device (not shown) is connected to both the terminal members 60 and 70 of each battery 1 restrained by the restraining jig, and each battery 1 is charged by constant current constant voltage (CCCV) charging until the battery voltage VB of each battery 1 reaches a predetermined value (3.97 V in this embodiment, corresponding to the SC2 of 91%).

In a second high-temperature aging step S7, second high-temperature aging is performed in which each battery 1 initially charged to the second SOC (SC2=91%) in the second initial-charging step S6 is placed under a second aging ambient temperature TE2 (63° C. in the present embodiment) within a second ambient temperature range TD2 of 60° C. to 75° C. for a second aging period EP2 (20 hours in the present embodiment) within a second period range EA2 of 6 to 30 hours while the positive terminal member 60 and the negative terminal member 70 are open. It is considered that the second high-temperature aging may advance the generation of SEI on each of the positive electrode sheet 30 and the negative electrode sheet 40 of each battery 1, resulting in an increase in the positive electrode irreversible capacity CPn and a further increase in the negative electrode irreversible capacity CNn already having occurred in the first initial-charging step S3 and the first high-temperature aging step S4.

Next, in a second cooling and leaving step S8, the batteries 1 are forcibly cooled by a fan for a second cooling period CP2 (20 minutes in this embodiment) in the cooling room (not shown) under a second cooling ambient temperature TC2 (20° C. in this embodiment). Furthermore, the batteries 1 are transferred to the standby room (not shown) controlled at a second ambient temperature TK2 (20.0° C. in this embodiment), and left standing for a second leaving period HP2 (30 minutes in this embodiment) to adjust the battery temperature TB of the batteries 1 to a third battery temperature TB3 (20.0° C. in this embodiment) equal to the second ambient temperature TK2 (see FIG. 2).

For easily comparing with the reference embodiment to facilitate the understanding of the present embodiment, the contents of the second initial-charging step S6 to the second cooling and leaving step S8 performed on the batteries 1 in the present embodiment are made the same as the contents of the initial-charging step SJ2 to the cooling and leaving step SJ4 performed on the batteries 1J in the reference embodiment.

Thereafter, in the inspection step S9, as in the reference embodiment, the batteries 1 having been adjusted to the third battery temperature TB3, 20° C., is subjected to various tests (their details are omitted), such as a self-discharge test to check the magnitude of self-discharge and a capacity test to check the magnitude of the capacity of the battery 1 to select out a good battery or batteries 1. Thus, the battery or batteries 1 are produced.

The properties of the battery(s) 1 in the present embodiment will be described below with reference to FIG. 3. Similar to the foregoing battery(s) 1J, the battery(s) 1 in the present embodiment is also a battery in which the negative electrode capacity CN of the negative electrode sheet 40 is not so large as compared with the positive electrode capacity CP of the positive electrode sheet 30, that is, a positive-to-negative electrode capacity ratio RC is equal to or less than 1.40 (RC=CN/CP≤1.40). Concretely, the positive-to-negative electrode capacity ratio RC in the present embodiment is 1.38 (RC=CN/CP=1.38).

However, unlike the battery(s) 1J (see FIG. 5), the battery(s) 1 has the negative electrode irreversible capacity increased by undergoing the above-described first initial-charging step S3 and the first high-temperature aging step S4. Thus, the negative electrode irreversible capacity CNn is made larger than the positive electrode irreversible capacity CPn (CPn<CNn) as shown in the upper graph of FIG. 3.

Figure 3:
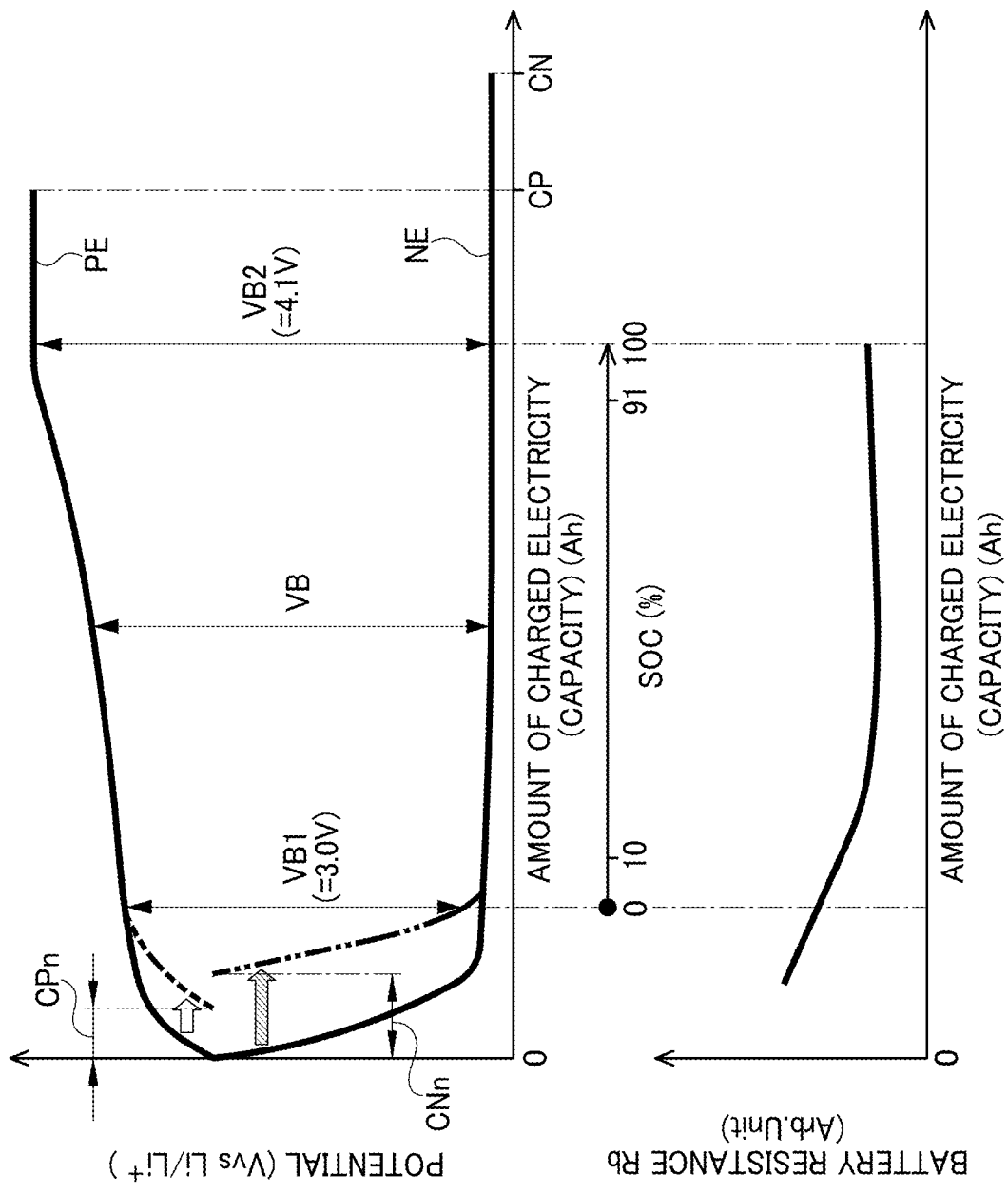
FIG. 3 is a graph showing battery properties in the embodiment, in which an upper graph shows a relationship between a charged charge amount (capacity), an electrode potential, and a battery voltage, and a lower graph shows a relationship between a charged charge amount (capacity) and a battery resistance.

Therefore, contrary to the battery(s) 1J, when the battery(s) 1 of the present embodiment comes into a low SOC state with for example a SOC of 10% or less as discharge advances, the negative potential NE greatly rises along a double-dotted chain line before the positive electrode potential PE largely drops along the broken line (i.e., in a right region with a large SOC in FIG. 3). Accordingly, the battery voltage VB, which is a difference between the positive electrode potential PE and the negative electrode potential NE, lowers close to the voltage VB1 of 3.0 V, corresponding to 0% SOC. In the low SOC region, consequently, the range where the positive electrode potential PE greatly decreased is not used and, as can be easily understood by comparing it with the lower graph in FIG. 5, the region where the battery resistance Rb greatly increased is not used even in the low SOC region as shown in the lower graph of FIG. 3. In other words, it is possible to obtain a high-capacity, compact battery(s) 1 with a small positive-to-negative electrode capacity ratio RC, but with a suppressed increase in battery resistance Rb even in the low SOC region.

Next, an investigation was made on the relationship of the magnitude SC1 of the first SOC in the first initial-charging step S3 and the length of the first aging period EP1 in the first high-temperature aging step S4 with respect to the magnitude of the battery resistance Rb for 21% SOC. The results of this investigation are studied as below, referring to FIG. 4.

Firstly, a battery, which is identical to the battery 1 in the foregoing embodiment, was subjected to the second initial-charging step S6 to the inspection step S9 after the stacking load application step S2 without undergoing the first initial-charging step S3, the first high-temperature aging step S4, and the first cooling and leaving step S5. This battery corresponds to the reference battery 1J subjected to the initial-charging step SJ3 to the inspection step S9 after the stacking load application step S2. The battery resistance Rb (DC-IR) of this battery was measured under the conditions: the battery temperature TB of 25° C. and the battery voltage VB of 3.50 V, which corresponds to 21% SOC, and plotted as a reference by a double-dotted chain line in FIG. 4. This example corresponds to the battery resistance Rb when the first aging period EP1 is 0.

Figure 4:
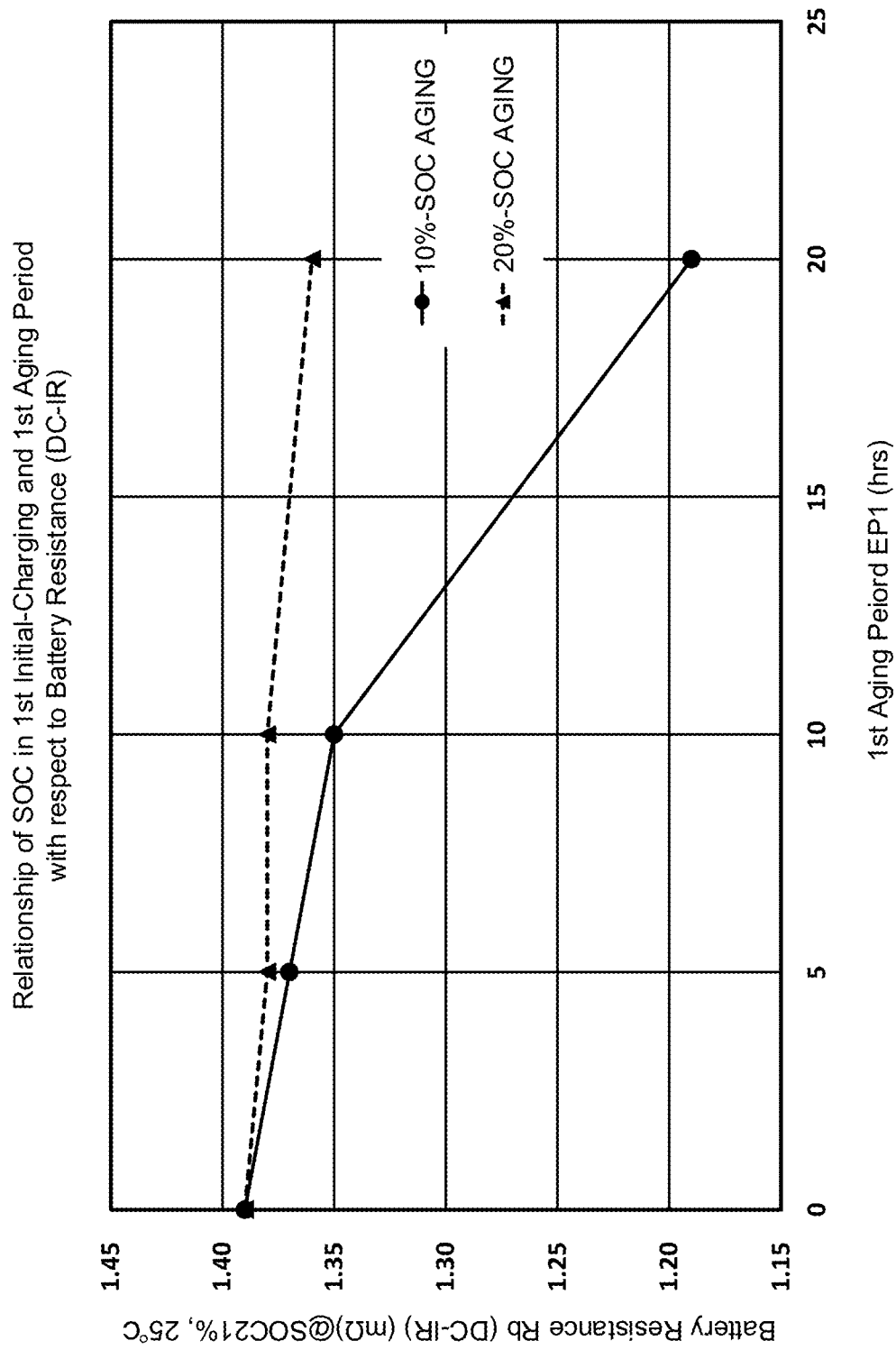
FIG. 4 is a graph showing SOC in a first initial-charging step and a relationship between a first aging period in a first high-temperature aging step and a battery resistance.

In FIG. 4, a legend "SOC-10% aging" denotes an example that the first SOC is set to SC1=10%, which corresponds to the voltage VB of 3.18 V, in the first initial-charging step S3, and the first aging period EP1 in the first high-temperature aging step S4 is changed in three stages, i.e., 5, 10, and 20 hours. On the other hand, a legend "SOC-20% aging" denotes an example that the first SOC is set to SC1=20%, which corresponds to the voltage VB of 3.49 V, in the first initial-charging step S3, and the first aging period EP1 in the first high-temperature aging step S4 is changed in three stages, i.e., 5, 10, and 20 hours.

The battery resistance Rb is obtained by the DC-IR measurement method. Specifically, the battery 1 to be tested is adjusted at a battery temperature TB of 25° C. and further this battery 1 is connected to a charge-discharge device and charged or discharged with a constant current constant voltage (CCCV) until the battery 1 comes into a charged state with 21% SOC. In other words, the battery voltage VB is set to 3.50 V, which corresponds to 21% SOC. Then, the battery 1 is discharged by constant current discharging (CC discharging) with a current value I at a predetermined discharging rate (30 C in the present example) to obtain a battery voltage decrease amount $\Delta V$ generated in the battery for a period of 0.1 to 10 seconds from the start of discharge. Thus, the battery resistance Rb is obtained based on an expression: $Rb=\Delta V/I$.

The reason for not considering the voltage drop that occurs during a period of 0.1 second from the start of discharging is to exclude the effect of the DC resistance of the battery 1, which is included in the voltage drop that occurs immediately after the current starts to flow.

As can be easily understood from FIG. 4, for the SOC-20% aging indicated by the broken line, that is, when the first SOC is set to a somewhat high value SC1, 20%, in the first initial-charging step S3, the battery resistance Rb hardly changes even if the first aging period EP1 is changed. This reveals that if the magnitude SC1 of the first SOC in the first initial-charging step S3 is set too large, for example, if SC1=20%, it is difficult to selectively generate the SEI on the negative electrode sheet 40 (the negative active material layer) in the first initial-charging step S3 and the first high-temperature aging step S4.

In contrast, for the SOC-10% aging, that is, when the first SOC is set to a relatively low value SC1, 10%, in the first initial-charging step S3, it is revealed that the battery resistance Rb decreases as the first aging period EP1 increases.

From the above results, it can be said that the magnitude of the first SOC in the first initial-charging step S3 may be set smaller than 20%. Separately, in view of the ease of forming the SEI on the negative electrode sheet 40, the first SOC may be selected from a range of SC1=13% or less. Furthermore, as shown in FIG. 4, it is revealed that, when the magnitude SC1 is 10% or less, a good battery resistance Rb can be obtained. Since it is necessary to supply an amount of Li ions that can form the SEI on a negative active material layer (i.e., negative active material particles) of a negative electrode sheet, the magnitude of the first SOC in the first initial-charging step S3 may be selected from at least the range of SC1=2% or more and further may be set to 5% or more.

Furthermore, it is revealed from FIG. 4 that the length of the first aging period EP1 in the first high-temperature aging step S4 may be set to 5 hours or longer and, more preferably, 10 hours or longer. In contrast, if the first aging period EP1 is too long, the throughput of steps will lower. Thus, the first aging period EP1 may be set to 25 hours or shorter and more preferably 20 hours or shorter as shown in FIG. 4.

In the present embodiment and the investigation results shown in FIG. 4, the first aging ambient temperature TE1 in the first high-temperature aging step S4 is set to 63° C. To achieve the effect of the first high-temperature aging step S4, that is, to generate the SEI on a negative electrode, the first aging ambient temperature TE1 may be set to 60° C. or more. Considering the degradation of the positive electrode due to too high temperature, the first aging ambient temperature TE1 may be set to 65° C. or less. That is, the first ambient temperature range TD1 may be set in the range of 60° C. to 65° C.

Furthermore, the magnitude SC2 of the second SOC in the second initial-charging step S6 may be set within the second SOC range SA2 of 13% to 91%, which is higher than the range selected as the first SOC in the first initial-charging step S3 and more preferably selected from a range of SC2=60% or more. In contrast, if the magnitude SC2 of the second SOC is too large, the positive active material, which contains less Li, is prone to cause crystal collapse and degradation in the second high-temperature aging step S7. Thus, the magnitude SC2 of the second SOC may be set to 91% or less.

The second aging period EP2 and the second aging ambient temperature TE2 in the second high-temperature aging step S7 can be set in the same way as the conventional high-temperature aging conditions. However, considering the properties of the battery 1 after the termination of the second high-temperature aging step S7 and the dissolution of foreign substances that may be contained in the electrode body 20, the second aging period EP2 may be selected from the range of 6 to 30 hours (i.e., the second period range EA2) and the second aging ambient temperature TE2 may be selected from the range of 60° C. to 75° C. (i.e., the second ambient temperature range TD2).

On the other hand, the upper graphs in FIGS. 3 and 5 and the positive electrode irreversible capacities CPna and CPn and the negative electrode irreversible capacities CNna and CNn in the battery 1J in the reference embodiment and the battery 1 in the present embodiment are obtained as follows.

In assembling the battery 1X (see FIG. 1) in the assembly step S1, a reference electrode (not shown) made of Li metal foil is placed so as to be immersed in the electrolyte solution 15, and a lead wire connected to the reference electrode is extended to the outside to assemble a battery 1X provided with the reference electrode. Thereafter, the same steps (the steps S2 and SJ3 to S9 or the steps S2 to S9) as those in the above-described steps of producing the battery 1J or the battery 1 are performed.

Then, CCCV charging is carried out at a constant current of ⅓ C until the battery voltage VB2 becomes 4.1 V, which corresponds to 100% SOC. Successively, CC discharging is performed at a constant current of ⅓ C until the battery voltage VB becomes 0V.

In each of the steps, the CCCV charging and CC discharging during the above period, the positive electrode potential PE that occurs between the reference electrode and the positive electrode (i.e., the positive terminal member 60), the negative electrode potential NE that occurs between the reference electrode and the negative electrode (i.e., the negative terminal member 70), and the battery voltage VB that occurs between the positive electrode (i.e., the positive terminal member 60) and the negative electrode (i.e., the negative terminal member 70) are obtained and plotted in the upper graphs in FIGS. 3 and 5.

When the battery voltage VB becomes 0V due to the CC discharging, the positive electrode potential PE and the negative electrode potential NE pass through the path indicated by the broken line or the double-dotted line in the upper graphs in FIGS. 3 and 5, and do not return to the initial state where the amount of charged electricity is 0. As shown in the upper graphs in FIGS. 3 and 5, the charged electricity amount corresponding to the end point on the low charged electricity amount side, i.e., the left end point in the graph, of the upper broken line indicating the path of the positive electrode potential PE is assumed as the positive electrode irreversible capacity CPna of the battery 1J or the positive electrode irreversible capacity CPn of the battery 1. Similarly, the amount of charged electricity corresponding to the end point on the low charged electricity amount side, i.e., the left end point in the graph, of the lower double-dashed line indicating the path of the negative electrode potential NE is assumed as the negative electrode irreversible capacity CNna of the battery 1J or the negative electrode irreversible capacity CNn of the battery 1.

For the battery 1J or the battery 1 produced through the foregoing steps, the battery resistance Rb at each charged electricity amount (each SOC) is obtained by the DC-IR measurement method and plotted in the lower graphs in FIGS. 3 and 5.

The present disclosure is described in the foregoing embodiments but is not limited thereto. The present disclosure may be embodied in other specific forms without departing from the essential characteristics thereof.

REFERENCE SIGNS LIST 1, 1J Battery (charged)
TB Battery temperature
30 Positive electrode sheet
40 Negative electrode sheet
50 Separator
CP Positive electrode capacity (of Positive electrode sheet)
CN Negative electrode capacity (of negative electrode sheet)
RC Positive-to-negative electrode capacity ratio
CPn, CPna Positive electrode irreversible capacity
CNn, CNna Negative electrode irreversible capacity
PE Positive electrode potential
NE Negative electrode potential
VB Battery voltage
VB1, VB1a 0%-SOC battery voltage
Vb2 100%-SOC battery voltage
S3 First initial-charging step
TA1 First battery temperature range
TB1 First in-charging battery temperature
SA1 First SOC range
SC1 First SOC
S4 First high-temperature aging step
EA1 First period range
EP1 First aging period
TD1 First ambient temperature range
TE1 First aging ambient temperature
S6 Second initial-charging step
TA2 Second battery temperature range
TB2 Second in-charging battery temperature
SA2 Second SOC range
SC2 Second SOC
S7 Second high-temperature aging step
EA2 Second period range
EP2 Second aging period
TD2 Second ambient temperature range
TE2 Second aging ambient temperature
S9 Inspection step
TB3 Inspection battery temperature
Rb Battery resistance (DC-IR)
SJ3 Initial-charging step
TBJ Charging battery temperature
SCJ Initial-charging SOC
SJ4 High-temperature aging step
EPJ Aging period
TEJ Aging ambient temperature
SJ5 Cooling step

What is claimed is:

1. A method of producing a lithium ion secondary battery, the lithium ion secondary battery including:
   a positive electrode; and
   a negative electrode,
   wherein a negative active material layer of the negative electrode and a positive active material layer of the positive electrode are arranged facing each other through a separator, so that the negative active material layer is wider than the positive active material layer and the negative active material layer includes an area where the negative active material layer faces the positive active material layer,
   wherein a negative-to-positive electrode capacity ratio between a positive capacity of the positive electrode and a negative capacity of the negative electrode is in a range of 1.02 to 1.40, and
   a negative electrode irreversible capacity of the negative electrode is larger than a positive electrode irreversible capacity of the positive electrode,
   wherein the method comprises:
   first initial-charging of an uncharged battery having the negative-to-positive electrode capacity ratio in the range of 1.02 to 1.40, under a first in-charging battery temperature within a first battery temperature range of 20° C. to 25° C. to a first SOC within a first SOC range of 2% to 13%;
   first high-temperature aging of placing the lithium ion secondary battery having been charged to the first SOC into a condition under a first aging ambient temperature within a first ambient temperature range of 60° C. to 65° C. for a first aging period within a first period range of 5 to 25 hours while a positive terminal and a negative terminal are open;
   after the first high-temperature aging, a first cooling period of 20 minutes followed by a first leaving period of 30 minutes to a second in-charging battery temperature within a second battery temperature range of 20° C. to 25° C.;
   after the first leaving period, a second initial-charging of the lithium ion secondary battery under the second in-charging battery temperature to a second SOC within a second SOC range of 13% to 91%, the second SOC being higher than the first SOC; and
   second high-temperature aging of placing the lithium ion secondary battery having been charged to the second SOC into a condition under a second aging ambient temperature within a second ambient temperature range of 60° C. to 75° C. for a second aging period within a second period range of 6 to 30 hours while the positive terminal and the negative terminal are open.

\* \* \* \* \*